United States Patent [19]

Izutsu et al.

[11] Patent Number: 4,850,666
[45] Date of Patent: * Jul. 25, 1989

[54] SLAB-TYPE OPTICAL DEVICE

[75] Inventors: Masayuki Izutsu, Ibaraki; Tadasi Sueta, Suita; Masaharu Matano, Kyoto, all of Japan

[73] Assignee: Omron Tateisi Electronics Co., Kyoto, Japan

[*] Notice: The portion of the term of this patent subsequent to Jun. 23, 2004 has been disclaimed.

[21] Appl. No.: 865

[22] Filed: Jan. 6, 1987

Related U.S. Application Data

[60] Division of Ser. No. 816,974, Jan. 6, 1986, which is a continuation of Ser. No. 496,213, May 19, 1983.

[30] Foreign Application Priority Data

| May 20, 1982 | [JP] | Japan | 57-86178 |
| Jul. 26, 1982 | [JP] | Japan | 57-130095 |
| Jul. 26, 1982 | [JP] | Japan | 57-130096 |

[51] Int. Cl.$^4$ ............................................. G02B 6/10
[52] U.S. Cl. ............................... 350/96.12; 350/96.15
[58] Field of Search ............... 350/96.12, 96.13, 96.14, 350/96.15, 96.11

[56] References Cited

U.S. PATENT DOCUMENTS 4,674,827  1/1987  Izutsu ................................ 350/96.12

OTHER PUBLICATIONS

Article entitled "Operation mechanism of the single-mode optical-waveguide Y junction" by Mr. Izutsu, Nakai & Sueta, in Optics Letters vol. 7, No. 3 Mar. 1982 pp. 136–138.

Japanese Article entitled "Integrated-Optical Modulators Using Guided-Wave Beam Splitters" by Mr. Izutsu, Enokihara, and Suta; dated May 21, 1982 vol. 82, No. 27, With English Translation Attached hereto. (Appln. No. 57-86178).

Article entitled "Optical-waveguide Micro-displacement sensor" by Mr. Izutsu, Enokihara and Sueta; dated Aug. 16, 1982, in Electronics Letters vol. 18, No. 20; Sep. 30, 1982, pp. 867 ad 868.

Article entitled "Optical-Waveguide Hybrid Coupler" by Izutsu, Enokihara and Sueta. In Optics Letters Nov. 1982, vol. 7, No. 11. pp. 549–551.

*Primary Examiner*—Gene Wan
*Attorney, Agent, or Firm*—Cushman, Darby & Cushman

[57] ABSTRACT

A slab-type optical device comprising a pair of single mode waveguides equal in phase constant and intersecting each other each at its one end and a pair of single mode waveguides different in phase constant and intersecting each other each at its one end. The pairs of waveguides are joined to each other at their intersections. The angle of intersection of the two waveguides in each pair is set to such a small value that when light propagates along the waveguide a very small distance, the variation in the spacing between the waveguides is negligible relative to the distance of propagation.

16 Claims, 8 Drawing Sheets (a)

(b)

F I G. 18
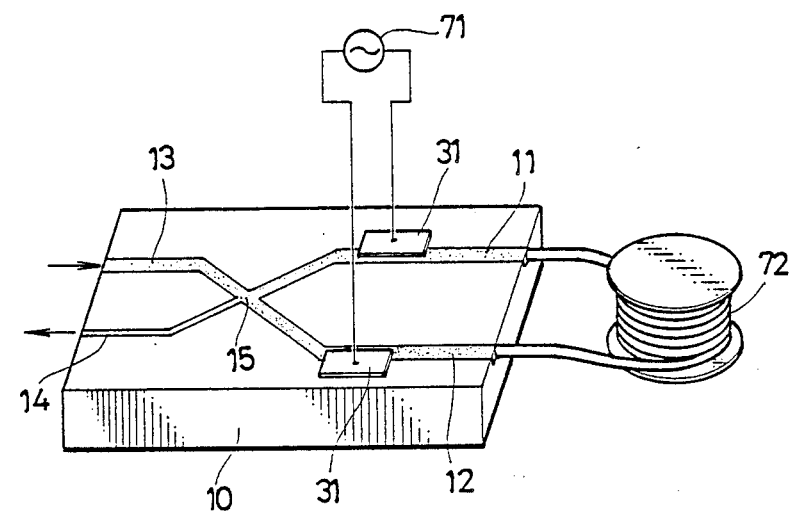

SLAB-TYPE OPTICAL DEVICE

This is a division of application Ser. No. 816,974, filed Jan. 6, 1986 which was a continuation of application Ser. No. 496,213 filed May 19, 1983.

BACKGROUND OF THE INVENTION

The present invention relates to slab-type optical devices, and more particularly to a light beam splitter for dividing a light beam in two or conversely for superposing two light beams and to application devices thereof.

Optical integrated circuit techniques are indispensable to the commercial use of optical communication systems and optical information processing systems. These techniques include a slab-type optical circuit technique which is an especially important basic technique. Many attempts have been made to fabricate optical circuits on substrate plates. A light beam splitter is one of such devices. A directional coupler has been used as a device which performs the function of the light beam splitter in a slab-type optical circuit. The coupler comprises two parallel waveguides formed on a substrate and arranged close to each other for transferring an optical power between the waveguides by coupling. When the distance between the waveguides, i.e. the degree of coupling, and the length of coupling are suitably determined, the coupler can perform the same function as a beam splitter. For this purpose, however, there is a need to accurately determine suitable values for the three parameters of the configuration of the waveguides, the spacing therebetween and the length of coupling.

SUMMARY OF THE INVENTION

An object of the present invention is to provide a slab-type light beam splitter which is easy to fabricate without the necessity of setting complex and accurate parameters and also to provide application devices thereof.

The slab-type optical device of the present invention essentially comprises a pair of single mode optical waveguides equal in phase constant and intersecting each other each at its one end and a pair of single mode optical waveguides different in phase constant and intersecting each other each at its one end, the pairs of waveguides being joined to each other at their intersections, the angle of intersection of the two waveguides in each pair being set to such a small value that when light propagates along the waveguide a very small distance, the variation in the spacing between the waveguides is negligible relative to the distance of propagation. The waveguide is provided by forming a portion on a substrate of optical material which portion has a higher refractive index than the surrounding portion. According to the invention, two pairs of waveguides are formed, with the waveguides of each pair intersecting each other at a very small angle, so that the device can be fabricated with ease without adjustment.

BRIEF DESCRIPTION OF THE DRAWINGS

FIG. 18 is a perspective view showing another application example of the invention as an optical fiber gyroscope.

DESCRIPTION OF THE PREFERRED EMBODIMENTS

Figure 1:
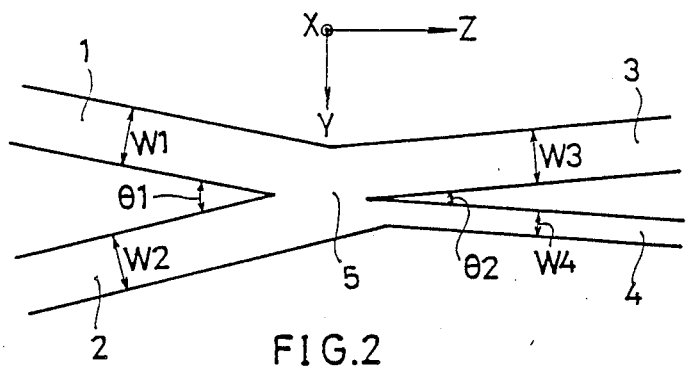
FIG. 1 shows the principle of operation of a slab-type light beam splitter.

A description will be given first of the principle of operation of a light beam splitter according to the present invention. With reference to FIG. 1, a pair of single mode optical waveguides 1 and 2 intersect each other at a very small angle $\theta 1$ each at its one end. These waveguides 1 and 2 have equal widths W1 and W2 and are therefore equal in phase constant. Another pair of single mode optical waveguides 3 and 4 also intersect each other at a very small angle $\theta 2$ each at its one end. The waveguides 3 and 4 have different widths W3 and W4. The width W4 of the waveguide 4 is smaller than the width W3 of the waveguide 3. Accordingly the waveguide 3 has a greater phase constant than the waveguide 4. The widths W1, W2 of the waveguides 1, 2 are equal to the width W3 of the waveguide 3 in FIG. 1 but need not always be equal thereto. Although the angles of intersection are in the relation of $\theta 1 > \theta 2$, $\theta 1$ may be equal to or smaller than $\theta 2$. The two pairs of waveguides 1, 2 and 3, 4 are joined together at their intersections approximately in alignment. The junction is indicated at 5. For the convenience of description, the direction from the waveguides 1, 2 toward the waveguides 3, 4 is taken as Z-axis, and the direction perpendicular to the plane of the drawing is taken as X-axis to provide X, Y, Z coordinate system. Further the waveguides 1, 2 will be referred to as a "symmetric side," and the waveguides 3, 4 as an "asymmetric side".

For the sake of simplicity, a two-dimensional structure will be considered which involves no change in X-direction. It is assumed that the two intersection angles $\theta 1$, $\theta 2$ are sufficiently small, such that light waves propagate approximately in the Z-direction and that the variation in the spacing between the waveguides 1, 2 as well as between the waveguides 3, 4 is negligible relative to a minute change in Z-direction. Thus when a fine section is considered except for the junction 5, there are two parallel waveguides which provide a uniform 5-layer structure in the Y-direction. The local normal mode analysis method can be applied to such a case.

Figure 2:
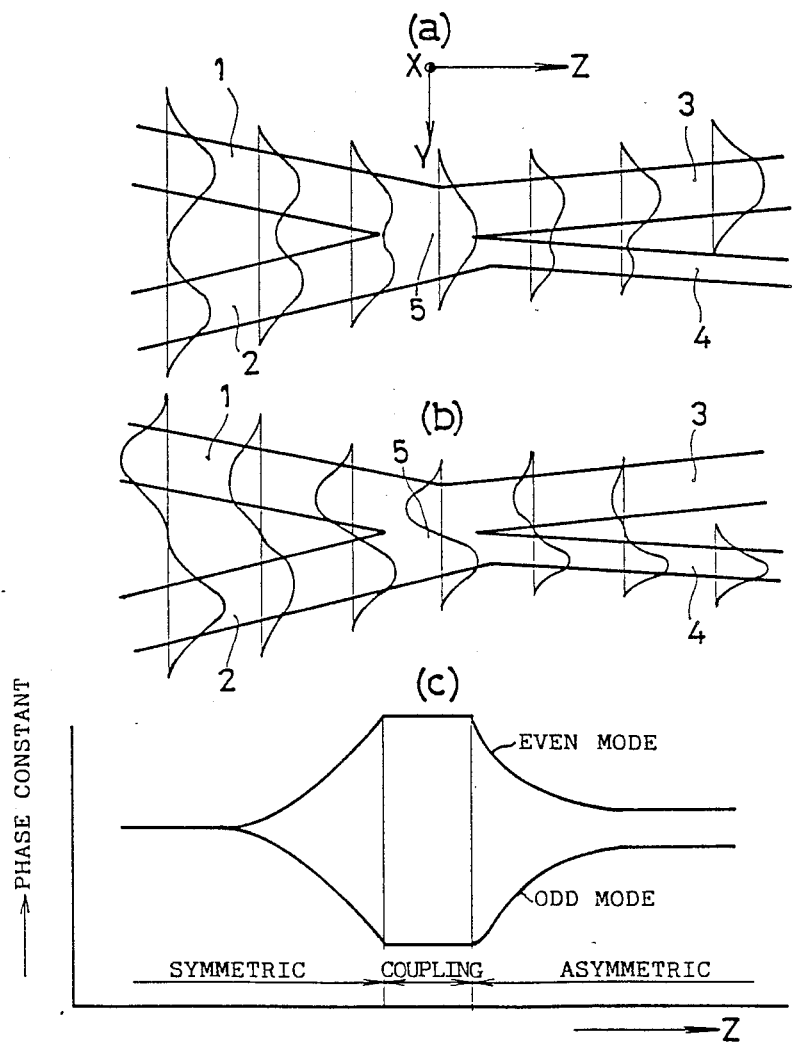
FIGS. 2(a) and (b) show the propagation of eigenmodes in the beam splitter.
FIG. 2(c) is a graph showing variations in phase constant.

As is well known, there are two modes, i.e., even mode and odd mode, as the eigenmodes of a five-layer structure comprising two single mode waveguides. FIGS. 2(a) and (b) show the states of propagation of the even mode and odd mode in the five-layer waveguide structure. FIG. 2(c) shows variations in the phase constant of the even mode and odd mode in the five-layer waveguide structure. At the symmetric side of the waveguides 1, 2, the two eigenmodes degenerate and are equal in phase constant at a location, sufficient away from the junction 5, where the waveguides 1 and 2 are spaced apart by a large distance, since the coupling between the waveguides is negligible. Toward the junction, the degeneracy decreases with an increasing difference between the two modes in phase constant. At the junction 5, the two waveguides unite to give a three-layer waveguide structure, so that the even mode transforms to the basic mode (the greater in phase constant) of the three-layer waveguide structure, and the odd mode to the primary mode (the smaller in phase constant). At the asymmetric side of waveguides 3, 4 beyond the junction, the spacing between the waveguides 3, 4 increases again to diminish the difference between the two modes in phase constant. However, since the waveguides 3, 4 differ in phase constant, the phase constants of the even and odd modes gradually approach the different values respectively. With the present case, the waveguide 3 has a larger width than the waveguide 4 and therefore a greater phase constant. Accordingly optical power of even mode concentrates on the waveguide 3, and optical power of odd mode on the waveguide 4.

When light travels from the asymmetric side toward the symmetric side, the propagation of the modes will be understood by referring to the above description in the reverse order.

Figure 3:
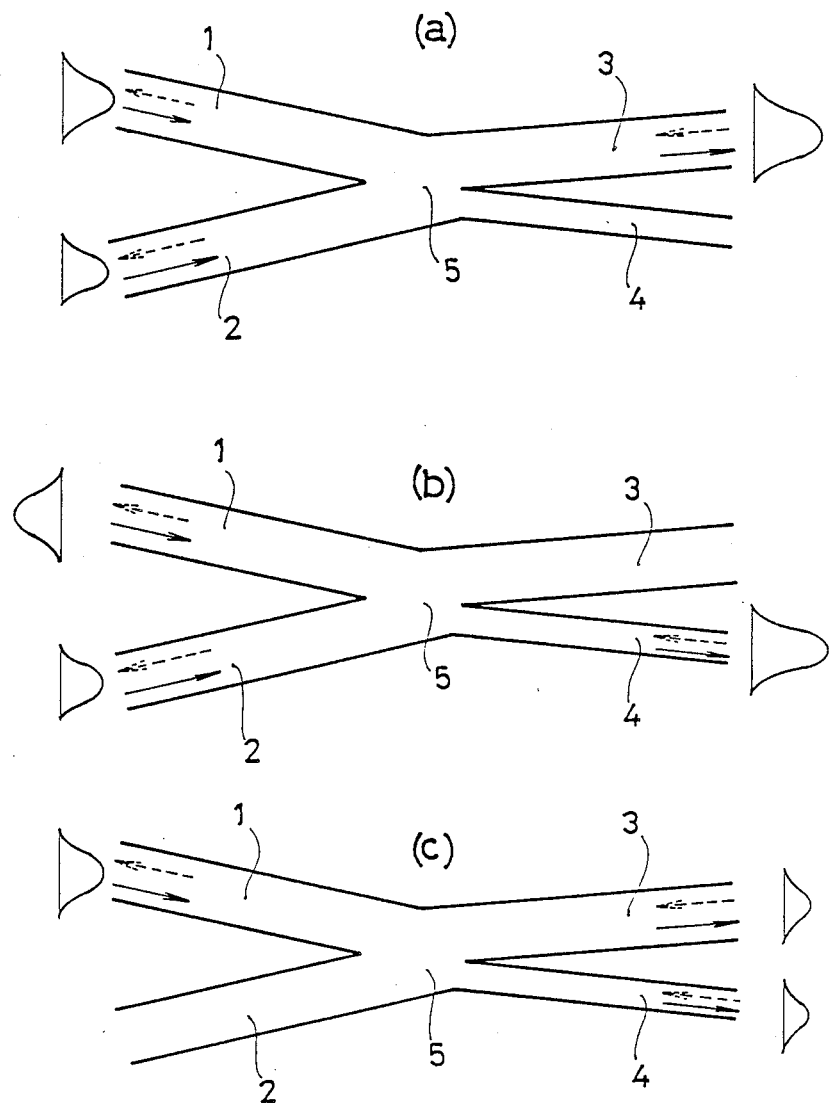
FIGS. 3(a), (b) and (c) show various relations between the input and output of optical waves in the beam splitter.

FIGS. 3(a) to (c) show the outputs obtained when various optical waves are fed to the waveguides from the symmetric side. In FIG. 3(a), optical waves in phase are fed to the waveguides 1, 2 at the symmetric side, at which the even mode is excited for propagation. The mode is changed to the basic mode at the junction 5 and again to the even mode at the asymmetric side. Since the optical wave power of even mode at the asymmetric side concentrates on the waveguide 3, an output is obtained from the waveguide 3. In FIG. 3(b), optical waves reverse in phase (180° different in phase) are fed to the two waveguides 1, 2 at the symmetric side. At this side, the odd mode is excited for propagation, then changed to the primary mode at the junction 5 and again changed to the odd mode at the asymmetric side. Since the optical wave power of odd mode at the asymmetric side concentrates on the waveguide 4, an output is obtained from the waveguide 4. In FIG. 3(c) an optical wave is given only to the waveguide 1. It is considered that the even mode and the odd mode are excited with equal power at the symmetric side in this case, so that FIG. 3(c) is the combination or superposition of FIGS. 3(a) and (b), giving optical waves from the waveguides 3 and 4.

Optical waves can be fed to the asymmetric side. In this case, a procedure reverse to the above is followed. For example, when an optical wave is fed to the waveguide 3, the waveguides 1, 2 at the symmetric side feed out optical waves in phase (as indicated by broken arrows in FIG. 3(a)). Other cases can be considered similarly. It will be understood from the foregoing description that the waveguide structure has a function equivalent to that of a usual light beam splitter (such as a half mirror).

Figure 4:
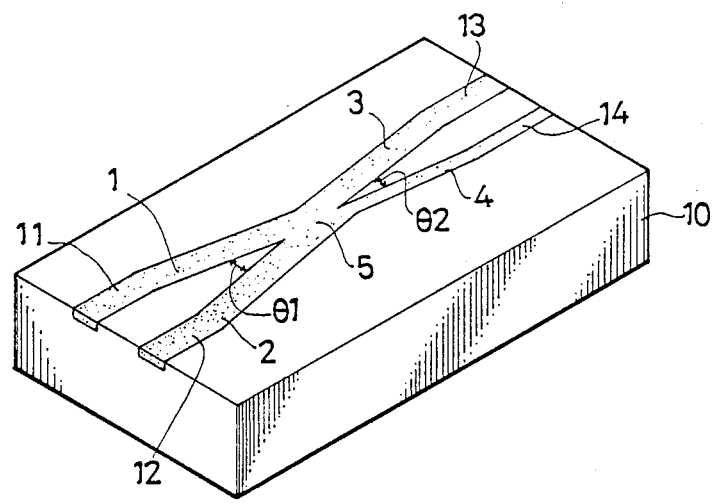
FIG. 4 is a perspective view showing an embodiment of the invention.

FIG. 4 shows an embodiment, in which a pair of waveguides 1, 2, another pair of waveguides 3, 4 and a junction 5 of the intersections as shown in FIG. 1 are formed over one surface of a substrate 10 of $LiNbO_3$ crystal by the thermal diffusion of Ti. Parallel waveguides 11 to 14 are joined to the outer ends of the waveguides 1 to 4 opposite to their junction 5. The waveguides 11, 12 can be the input side, and the waveguides 13, 14 can be the output side. Conversely, the waveguides 13, 14 are serviceable as the input side and the waveguides 11, 12 as the output side. In either case, the embodiment is adapted for various modes of optical division or superposition as already described above. The angle of intersection, $\theta_1$, of the waveguides 1, 2 and the angle of intersection, $\theta_2$, of the waveguides 3, 4 are as small as up to 1 or 2°. When the intersection angle $\theta_2$ of the waveguides 3, 4 is small, the asymmetry of these waveguides can be emphasized, so that it is advantageous to make the angle $\theta_2$ at the asymmetric side smaller than the angle $\theta_1$ at the symmetric side.

Various optical materials other than $LiNbO_3$ can be used for the substrate. For example, the waveguides can be formed by diffusing silver ions over a glass substrate.

Figure 5:
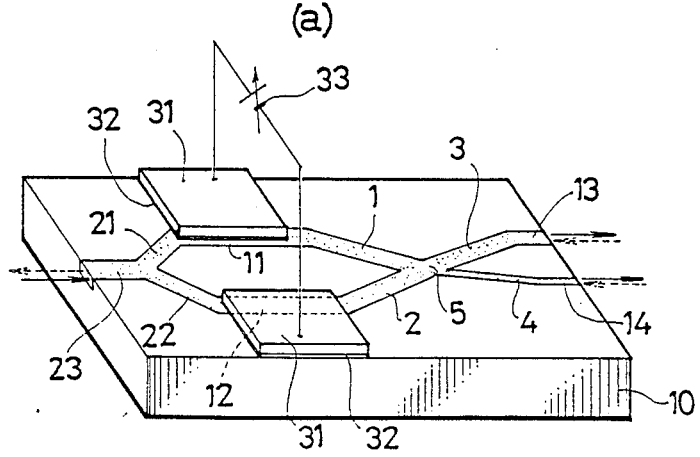
FIGS. 5(a) and (b) and FIG. 6 show an application example of the beam splitter of the invention, FIG. 5(a) being a perspective view, FIG. 5(b) being a diagram showing an assembly of waveguides, and FIG. 6 being a graph showing the relation between the applied voltage and the relative intensity of output beam.
Figure 5:
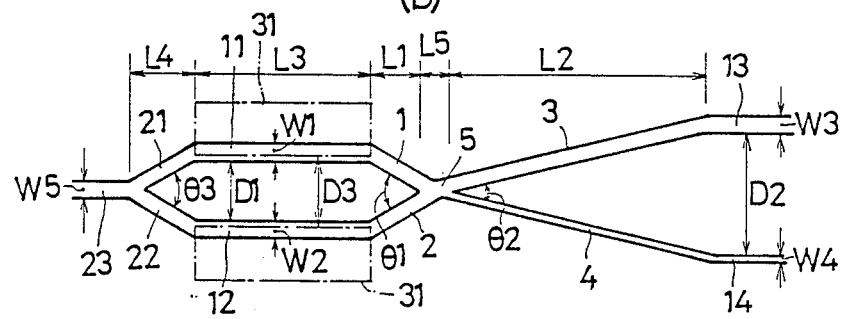

FIG. 5 shows an application example which is a differential optical modulation device incorporating the slab-type beam splitter of the invention for giving outputs reverse to each other. In addition to the above-mentioned waveguides 1 to 4, junction 5 and waveguides 11 to 14, a Y-shaped branch including waveguides 21 to 23 is formed on a substrate 10 of $LiNbO_3$ by diffusing Ti as seen in FIG. 5. The waveguides 21, 22 are joined to the waveguides 11, 12, respectively. A pair of electrodes 31 are formed on the parallel waveguides 11, 12, with a buffer layer 32 of $SiO_2$ interposed between the waveguide and the electrode. Voltage V is applied across the electrodes 31. The buffer layer 32 prevents absorption of light by the electrode 31. The electrodes 31 may cover the waveguides 11, 12 entirely or partially.

FIG. 5(b) is a plan view showing the waveguides. With reference to this drawing, the dimensions of the components of the device will be given below for illustrative purposes.

Figure 6:
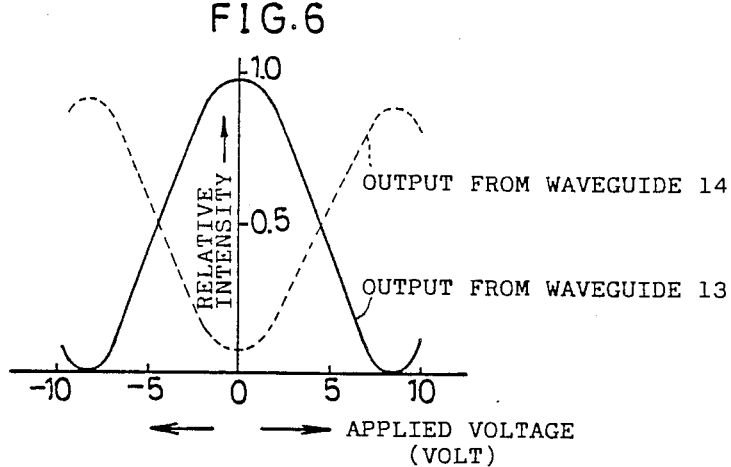

Width W1 of waveguides 1, 11, width W2 of waveguides 2, 12 and width W5 of waveguides 21 to 23: 3 μm Width W3 of waveguides 3, 13: 3 μm
Width W4 of waveguides 4, 14: 2.5 μm
Angle $\theta_1$ of intersection of waveguides 1, 2: 0.02 rad
Angle $\theta_2$ of intersection of waveguides 3, 4: 0.005 rad
Angle $\theta_3$ of intersection of waveguides 21, 22: 0.02 rad
Length L1 of waveguides 1, 2: 1 mm
Length L2 of waveguides 3, 4: 8 mm
Length L5 of junction 5: 40 μm
Length L3 of waveguides 11, 12 and electrodes 31: 10 mm
Length L4 of waveguides 21, 22: 1 mm
Distance D1 between waveguides 11, 12: 20 μm
Distance D2 between waveguides 13, 14: 40 μm
Distance D3 between electrodes 31: 22 μm An optical wave is incident on the waveguide 23 and is divided in two by the waveguides 21, 22. When a voltage is applied across the pair of electrodes 31, a difference in phase occurs between the two divided waves in proportion to the applied voltage in the course of propagation of the waves through the waveguides 11, 12 since the substrate has an electro-optical effect. As already described with reference to FIGS. 3(a) and (b), therefore, an optical wave output or outputs are delivered from one or both of the waveguides 13, 14 in accordance with the phase difference. FIG. 6 shows the relative intensity of light emitted from the waveguides 13, 14. It is seen that the light output from the waveguide 13 and that from the waveguide 14 are in reverse relation to each other.

With the present modulation device, light can be made incident on the waveguide 13 or 14. This corresponds to the incidence of light in the direction of the broken line in FIG. 3(a) or (b). The waveguide 23 gives an optical output modulated in accordance with the voltage V applied to the electrodes 31. Moreover, the output obtained when the input is given to the waveguide 13 is reverse to that obtained when the input is given to the waveguide 14.

Figure 7:
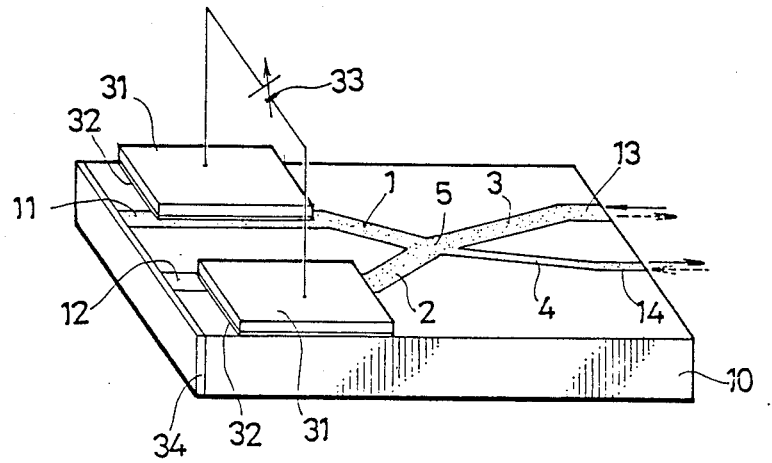
FIGS. 7 and 8 show another application example, FIG. 7 being a perspective view, and FIG. 9 being a graph showing the relation between the applied voltage and the relative intensity of output beam.

FIG. 7 shows another application example which is a differential optical modulation device of the reflection type including the slab-type optical beam splitter of the invention. This device has the same construction as the device of FIG. 5 except that the Y-shaped branch is not provided and that the ends of the parallel waveguides 11, 12 opposite to their ends joined to the waveguides 1, 2 are terminal ends, where the end face of the substrate 10 is formed with a reflecting film 34, for example, by the vacuum evaporation of aluminum.

Figure 8:
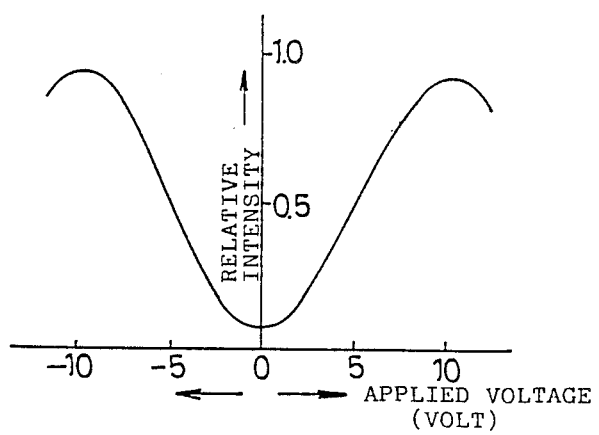

The light incident on one of the waveguides at the asymmetric side, e.g. the waveguide 13, is equally divided and led into the waveguides 1, 2 when propagating from the junction 5 toward the symmetric side, passes through the parallel waveguides 11, 12, is reflected from the film 34 and again passes through the waveguides 11, 12. While reciprocating through the waveguides 11, 12, the beams are modulated by the electrodes 31 and become different in phase. In accordance with the phase difference, the light propagates through one of the waveguides 4 and 3, or through both as divided in a suitable ratio. When the beams through the waveguides 11, 12 become exactly reverse in phase (i.e., 180° different in phase), the light incident on the waveguide 13 almost wholly egresses from the waveguide 14. FIG. 8 shows the relation between the voltage applied to the electrodes 31 and the relative intensity of the light emitting from one of the waveguides 13, 14 which light is included in the light incident on the other waveguide.

While a phase difference is electrically given to the beams propagating through the two parallel waveguides according to the example of FIG. 7, the phase difference can be given to the two beams by a different method.

Furthermore a pair of phase modulating electrodes can be so disposed as to hold one of the waveguides 11 to 14 therebetween.

Figure 9:
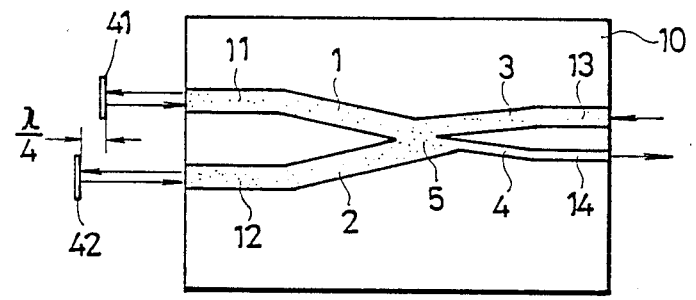
FIGS. 9 to 11 are diagrams showing other application examples.

With reference to FIG. 9, light is emitted from the parallel waveguides 11, 12 outside the substrate 10 once, then reflected from reflecting surfaces 41, 42 of mirrors or articles arranged outside the substrate 10 and led into the waveguides 11, 12 again. The intensity of output light varies with the position of the reflecting surfaces 41, 42 relative to each other. For example, when the distance between the reflecting surfaces 41, 42 is λ/4 wherein λ is the wavelength of light, the light incident on the waveguide 13 is almost entirely emitted from the waveguide 14. This arrangement can be used for optical reading for optical digital disks or the like. Light may be led out and into the waveguides 11, 12 with use of optical fibers or a lens system.

Figure 10:
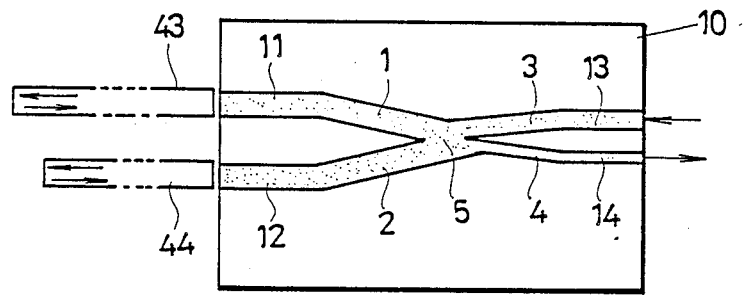

With the application example shown in FIG. 10, beams are emitted from the waveguides 11, 12, guided into separate optical fibers 43, 44 individually, reflected from the forward ends of the fibers 43, 44 and returned to the waveguides 11, 12. The difference between the two optical fibers in physical quantity, such as fiber length or the temperature to which the fibers are subjected, is converted to a variation in the intensity of output light from the waveguide 14, so that the arrangement is usable for measuring such a physical quantity.

Figure 11:
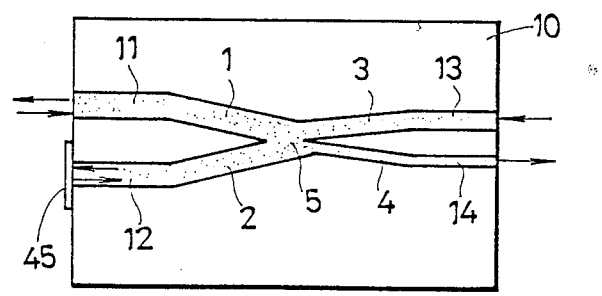

With reference to FIG. 11, the waveguide 12 is provided at its outer end with a reflecting film 45. The light through the waveguide 12 undergoes no change in phase. Light egresses from the other waveguide 11 only and is returned to the same waveguide 11 again by some means. A factor which changes the phase of the light through the waveguide 11, for example the length or temperature of optical fiber as mentioned above, is converted to a variation in the intensity of light output from the waveguide 14.

While light is incident in the waveguide 13 and delivered from the waveguide 14 in the embodiments of FIGS. 9 to 11, light may be made incident on the waveguide 14 to give an output from the waveguide 13.

Figure 12:
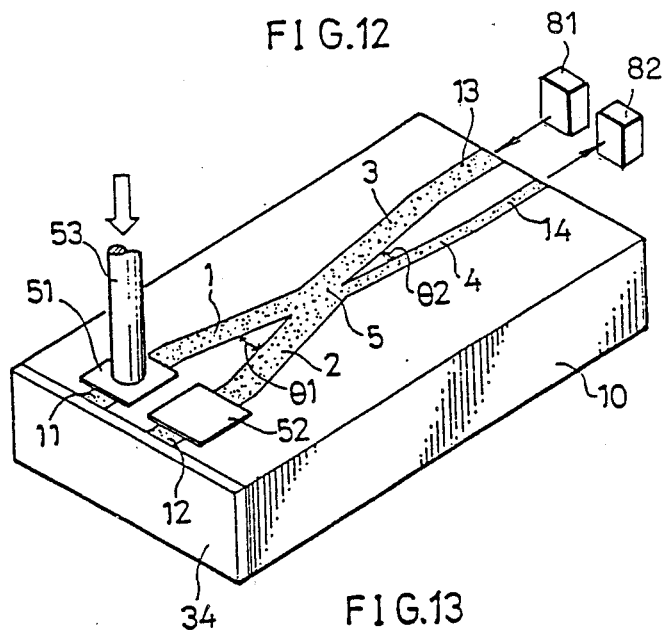
FIGS. 12 to 14 show other application examples, i.e., optical pressure sensors, FIG. 12 being a perspective view, FIG. 13 being a graph showing variations in the intensity of output beam with pressure, and FIG. 14 being a perspective view showing a modification.

FIG. 12 shows an optical pressure sensor embodying the present invention. The sensor has the same structure as the example of FIG. 7 except that thin $SiO_2$ films 51, 52 of the same length are formed on the waveguides 11, 12 in place of the electrodes 31 and the buffer layers 32. The waveguides 3, 13 serve for receiving an input, the waveguides 4, 14 give an output, and the waveguides 1, 2, 11, 12 are used for detecting pressure. Light is incident on the asymmetric side as indicated in a broken line in FIG. 3(a). The pressure to be detected is applied onto the thin film 51 by a rod 53. When the pressure to be detected is produced by mechanical means, the rod 53 is connected directly or indirectly to the means. If the pressure is a hydraulic pressure, the rod 53 is connected to the piston of a cylinder to which the fluid is introduced. Instead of the rod 53, the cylinder may be provided on the $SiO_2$ film 51 to introduce the fluid directly to the cylinder.

Figure 13:
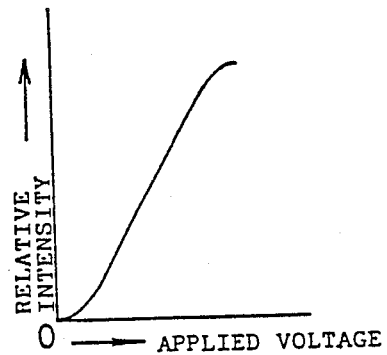

Through an optical system or optical fiber, light is incident on the input waveguide 13 from a suitable light source 81. The output waveguide 14 is connected to a photoelectric sensor 82 by an optical system or optical fiber. When no pressure is applied through the rod 53, the waveguides 1, 11 are equal to the waveguides 2, 12 in phase constant. Consequently the light incident on the waveguide 13 is equally divided to propagate through the waveguides 1, 2, reflected from the reflecting film 34 and thereafter returned to the waveguide 13, giving no output from the waveguide 14 (see FIG. 3(a)). When a pressure is applied by the rod 53, the pressure alters the thickness of the waveguide 11, and the strain resulting from the pressure varies the refractive index of the waveguide 11 to vary the phase constant of the waveguide 11. This produces a difference in phase between the beams propagating through the waveguides 1, 11 and the waveguides 2, 12 to emit light from the waveguide 14 with an intensity in accordance with the phase difference. The pressure can be detected by measuring the intensity of the light egressing from the waveguide 14. FIG. 13 shows variations in the intensity of the output light from the waveguide 14 at varying applied pressures.

In FIG. 12, light may be incident on the waveguide 14 to obtain a light output from the waveguide 13. Further the pressure may be applied to the film 52 alternatively. If different pressures are applied to the $SiO_2$ films 51, 52, the pressure difference therebetween is detectable. It is also possible to use the waveguides 1, 11, 2, 12 for input and output and the waveguides 3, 13, 4, 14 for detecting pressure.

Further if the positions of reflection of light through the waveguides 11, 12 are made different by $\lambda/4$ wherein $\lambda$ is the wavelength of light, output light of maximum intensity is obtained from the waveguide 14 when no pressure is applied to the sensor. The light reflecting means, which is formed on the substrate 10, may be provided outside the substrate 10. Useful reflecting means other than the reflecting mirror is, for example, the end face of an optical fiber.

Figure 14:
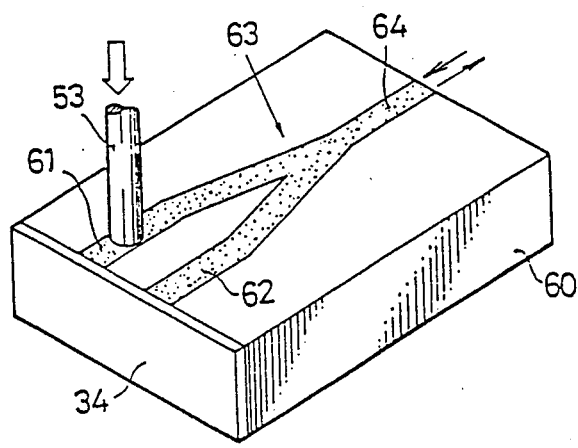

FIG. 14 shows another application example. A single mode waveguide 64 for input and output, a Y-shaped light dividing branch 63 joined to the waveguide 64, and a pair of pressure detecting single mode waveguides 61, 62 joined to the Y-shaped branch 63 are formed on a glass substrate 60 by diffusing silver ions in an electric field. A reflecting film 34 is formed by vacuum evaporation of aluminum on the end face of the substrate 60 where the waveguides 61, 62 terminate. Of the pair of waveguides 61, 62, the waveguide 61 is provided with a rod 53 for applying the pressure to be detected. Light is incident on the waveguide 64. When no pressure is applied, no difference occurs in phase between the light beams propagating through the pair of waveguides 61, 62, so that the light composed of superposed beams through the waveguides 61, 62 and emanating from the waveguide 64 has a maximum intensity. A pressure, if applied to the waveguide 61 through the rod 53, alters the phase constant of the waveguide 61, with the result that light modulated in intensity by the pressure is delivered from the waveguide 64.

Figure 15:
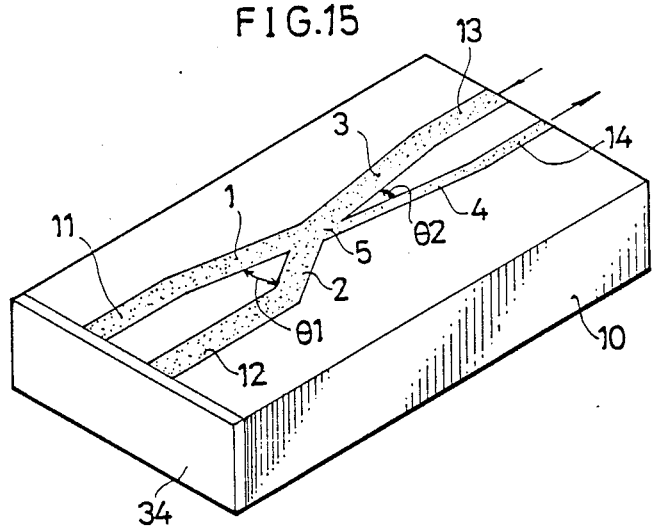
FIGS. 15 to 17 show other application examples, i.e., optical temperature sensors, FIG. 15 being a perspective view, FIG. 16 being a graph showing variations in the intensity of output beam with temperature, and FIG. 17 being a perspective view showing a modification.

FIG. 15 shows an optical temperature sensor embodying the invention and comprising input waveguides 3, 13, output waveguides 4, 14 and temperature detecting waveguides 1, 2, 11, 12. Although this application example has basically the same structure as the one shown in FIG. 12, the $SiO_2$ films 51, 52 are not included in the example of FIG. 15. There is a difference ld between the sum of the lengths of the waveguides 1, 11, i.e., the distance from the junction to the reflecting film 34 through these waveguides 1, 11, and the sum of the lengths of the waveguides 2, 12, i.e., the distance from the junction 5 to the reflecting film 34 by way of the waveguides 2, 12. This difference is set to satisfy the following equation at a predetermined standard temperature, for example, 0° C. or room temperature (20° C.).

$$ld = M \times \left( \frac{\lambda o}{2n} \right) \quad (1)$$

wherein M is an integer, $\lambda o$ is the wavelength of light in a free space, and n i the refractive index of the waveguides.

A light wave is incident on the waveguide 13 and dividedly led into waveguides 1, 2 from the junction 5. Upon reflection reflecting film 34, the divided waves are returned to the junction 5, where they are superposed. At the standard temperature, the difference between the light phase is M times the wavelength $\lambda o$ of the light waveguides divided by n, $\lambda o/n$, so that the superposed waves advance only into the waveguide 3 to give an output from the waveguide 13.

The angles of intersection $\theta 1$ and $\theta 2$ are very small, and all the waveguides are considered to be along the same direction (i.e. the direction of x-axis of the substrate crystal 10 in the present embodiment). Accordingly the variation in the length of waveguides with temperature can be calculated with use of the coefficient of thermal expansion $\alpha_{xx}$ of $LiNbO_3$ which is $1.54 \times 10^{-5}$ °$C^{-1}$. The variation $\Delta ld$ in the difference ld between the aforesaid lengths of the waveguides due to a difference in temperature $\Delta T$ is given by $$\frac{\Delta ld}{ld} = 1.54 \times 10^{-5} \times \Delta T. \quad (2)$$

Equations (1) and (2) give $$\Delta T = \left( \frac{2n}{M\lambda o} \right)\left( \frac{\Delta ld}{1.54 \times 10^{-5}} \right). \quad (3)$$

When $\Delta ld$ is $\lambda o/4n$, a phase difference of $\lambda o/2n$, which is equal to one half the wavelength of light through the waveguide, occurs between the superposed beams at the junction 5, giving output light from the waveguide 14 only, with no output from the waveguide 13. At this time, $$\Delta T \approx \frac{32500}{M}. \quad (4)$$

Figure 16:
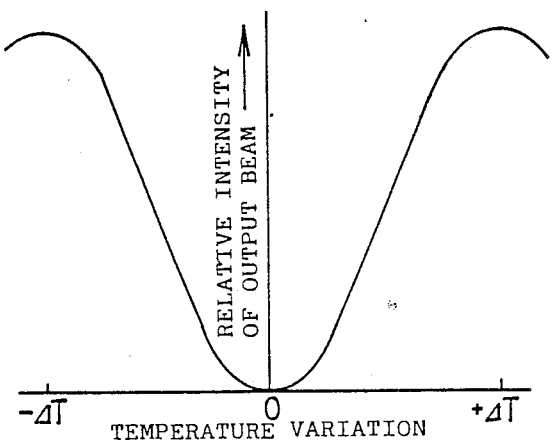

FIG. 16 shows variations in the intensity of the output light from the waveguide 14 with variations in temperatures. The range and accuracy of temperature measurements can be determined by suitably setting the difference ld between the lengths of waveguides.

Figure 17:
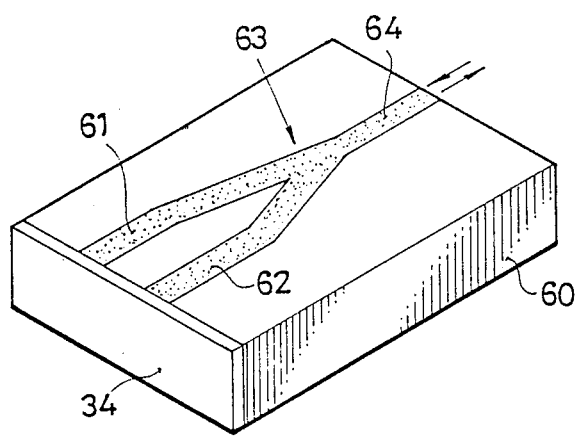

FIG. 17 shows a modification which has the same structure as the example of FIG. 14 except that the waveguides 61, 62 differ in length.

FIG. 18 shows an optical fiber gyroscope embodying the invention and similar in construction to the example of FIG. 17. An optical fiber coil 72 is connected between the waveguides 11 and 12. A high-frequency voltage is applied across the electrodes 31 for subjecting light to phase modulation to measure angular velocities with improved accuracy in a region where the phase difference due to the Sagnac effect is small. A laser beam is incident on the waveguide 13, and the laser beam emanating from the waveguide 14 is analyzed to determine the angular velocity of rotation.

What is claimed is:

1. A waveguide-type optical sensor comprising:
   a substrate,
   an input-output single mode optical waveguide means formed in said substrate, a pair of single mode optical waveguides joined to one end of said input-output waveguide means and formed in said substrate, means for modulating at least one least one light beam propagating through said waveguides according to a physical quantity to be detected; and means for making said at least one light beam incident on said input-output waveguide means, and means for detecting the intensity of light emanating from said input-output waveguide means.

2. A sensor as defined in claim 1 wherein said modulating means includes means for applying pressure to be detected to at least one of said waveguides.

3. A sensor as defined in claim 1, wherein said modulating means causes a difference in phase between the light beams in accordance with variation in temperature to be detected.

4. A sensor as defined in claim 1 wherein said input-output waveguide means comprises a pair of single mode optical waveguides intersecting each other each at its one end.

5. An optical device for use in a waveguide-type optical sensor comprising:

a waveguide device comprising a substrate, a pair of single mode optical waveguides equal in phase constant and intersecting each other each at its one end and a pair of single mode optical waveguides different in phase constant and intersecting each other at its one end, said pairs of waveguides being formed in said substrate and joined to each other at their intersection, the angle of intersection of said two waveguides in each pair being set to such a small value that when light propagates along said waveguide a very small distance, the variation in the spacing between said waveguides in negligible relative to the distance of propagation, and means for reflecting a light egressing from one of said waveguides and for returning the light to said waveguide.

6. An optical device for use in a sensor as defined in claim 5 wherein said light reflecting means is formed on said substrate.

7. An optical device for use in a sensor as defined in claim 5 wherein said light reflecting means is provided outside said substrate.

8. An optical device for use in a waveguide-type optical sensor comprising:

a waveguide device comprising a substrate, a first optical waveguide and a pair of second optical waveguides joined to one end of said first optical waveguide, said first and second waveguides being formed in said substrate, and means for reflecting a light output from one of said waveguides and for returning the light to said waveguide.

9. An optical device for use in a sensor as defined in claim 8 wherein said second optical waveguides of the pair are different form each other in length.

10. An optical modulation device comprising:

a waveguide device comprising a substrate, a pair of single mode optical waveguides equal in phase constant and intersecting each other each at its one end and a pair of single mode optical waveguides different in phase constant and intersecting each other at its one end, said pairs of waveguides being formed in said substrate and joined to each other at their intersections, the angle of intersection of said two waveguides in each pair being set to such a small value that when light propagates along said waveguide a very small distance the variation in the spacing between said waveguides is negligible relative to the distance of propagation, and means for modulating at least one optical beam propagating through said waveguides by applying an electric signal.

11. An optical pressure sensor comprising:

a substrate with a substantially uniform index of refraction;

first monomode waveguide means, formed in said substrate, for propagating optical energy in a direction axial thereto, said first waveguide means having a dimension $w_1$ transverse to its axial direction;

second monomode waveguide means, formed in said substrate, for propagating optical energy in a direction axial thereto, said second waveguide means having a dimension $w_2$ transverse to its axial direction, said first and second waveguide means intersecting one another at an angle $\theta_1$ small enough to make the variations in the distance between corresponding points of said first and second waveguide means over an incremental length in the respective axial directions of said first and second waveguide means negligible relative to said incremental length;

third monomode waveguide means, formed in said substrate, for propagating even mode optical energy in a direction axial thereto, said third waveguide means having a dimension $w_3$ transverse to its axial direction;

fourth monomode waveguide means, formed in said substrate, for propagating odd mode optical energy in a direction axial thereto, said fourth waveguide means having a dimension $w_4$ transverse to its axial direction, said third and fourth waveguide means intersecting one another at an angle $\theta_2$; and means for coupling the intersection of said first and second waveguide means to the intersection of said third and fourth waveguide means;

wherein:

said dimensions $w_1$ and $w_2$ are equal, said dimension $w_4$ is different from said dimension $w_3$, said first and fourth waveguide means are approximately axial to one another, said second and third waveguide means are approximately axial to one another, the intersection of said first and second waveguide means is adjacent to the intersection of said third and fourth waveguide means, and at least one of said first, second, third and fourth waveguide means includes means for modulating the optical energy propagating therethrough according to mechanical pressure applied thereto.

12. A sensor as defined in claim 11 further including means for detecting the intensity of optical energy propagating through another one of said first, second, third and fourth waveguide means.

13. An optical temperature sensor comprising:

a substrate with a substantially uniform index of refraction;

first monomode waveguide means, formed in said substrate, for propagating optical energy in a direction axial thereto, said first waveguide means having a dimension $w_1$ transverse to its axial direction;

second monomode waveguide means, formed in said substrate, for propagating optical energy in a direction axial thereto, said second waveguide means having a dimension $w_2$ transverse to its axial direction, said first and second waveguide means intersecting one another at an angle $\theta 1$ small enough to make the variations in the distance between corresponding points of said first and second waveguide means over an incremental length in the respective axial directions of said first and second waveguide means negligible relative to said incremental length;

third monomode waveguide means, formed in said substrate, for propagating even mode optical energy in a direction axial thereto, said third waveguide means having a dimension $w_3$ transverse to its axial direction;

fourth monomode waveguide means, formed in said substrate, for propagating odd mode optical energy in a direction axial thereto, said fourth waveguide means having a dimension $w_4$ transverse to its axial direction, said third and fourth waveguide means intersecting one another at an angle $\theta 2$; and means for coupling the intersection of said first and second waveguide means to the intersection of said third and fourth waveguide means;

means for terminating said first waveguide means with an optical reflecting element a first distance from said coupling means;

means for terminating said second waveguide means with an optical reflecting element a second distance from said coupling means different from said first distance; and means for applying optical energy to at least one of said third and fourth waveguide means, wherein:

said dimensions $w_1$ and $w_2$ are equal, said dimension $w_4$ is different from said dimension $w_3$, said first and fourth waveguide means are approximately axial to one another, said second and third waveguide means are approximately axial to one another, the intersection of said first and second waveguide means is adjacent to the intersection of said third and fourth waveguide means, and wherein the optical energy propagating through said first and second waveguide means is modulated according to the temperature thereof.

14. A sensor as defined in claim 13 further including means for detecting the intensity of optical energy propagating through at least one of said third and fourth waveguide means.

15. An optical pressure sensor comprising:

a substrate having at least one input-output single mode optical waveguide and a pair of single mode optical waveguides joined to one end of the waveguide, means for reflecting light waves through the waveguide, means for applying the pressure to be detected to the optical pressure sensor; and means for making light waves incident on the input-output waveguide, and means for detecting the intensity of light emanating from the input-output waveguide.

16. An optical temperature sensor comprising a substrate having at least one input-output single mode optical waveguide and a pair of single mode optical waveguides joined to one end of the waveguide, means for reflecting light waves through the waveguide, the waveguides of the pair being different from each other in length, and means for making light waves incident on the input-output waveguide, and means for detecting the intensity of light emanating from the input-output waveguide.

* * * * *